United States Patent
Zhang et al.

(10) Patent No.: US 9,886,259 B2
(45) Date of Patent: Feb. 6, 2018

(54) METHOD AND TERMINAL DEVICE FOR COMPLYING ROUTER MANAGEMENT APPLICATION WITH ROUTER FIRMWARE

(71) Applicant: Xiaomi Inc., Beijing (CN)

(72) Inventors: Pengfei Zhang, Beijing (CN); Yong Chen, Beijing (CN); Yongfeng Xia, Beijing (CN); Heng Qu, Beijing (CN); Yidong Wang, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 0 days.

(21) Appl. No.: 14/729,054

(22) Filed: Jun. 3, 2015

(65) Prior Publication Data
US 2016/0062760 A1  Mar. 3, 2016

Related U.S. Application Data

(63) Continuation of application No. PCT/CN2015/074627, filed on Mar. 19, 2015.

(30) Foreign Application Priority Data

Aug. 27, 2014 (CN) .......................... 2014 1 0429737

(51) Int. Cl.
G06F 9/45 (2006.01)
G06F 9/445 (2006.01)
(Continued)

(52) U.S. Cl.
CPC .............. G06F 8/65 (2013.01); H04L 41/082 (2013.01); H04L 41/0873 (2013.01);
(Continued)

(58) Field of Classification Search
CPC .. G06F 8/60–8/68; G06F 8/65; H04L 41/082; H04L 41/0859; H04L 41/0873; H04L 41/0886; H04L 67/34
See application file for complete search history.

(56) References Cited

U.S. PATENT DOCUMENTS 6,175,868 B1 * 1/2001 Lavian ................ H04L 41/0816
709/223
6,516,347 B1 * 2/2003 Nakamura .......... H04L 41/0859
709/221
(Continued)

FOREIGN PATENT DOCUMENTS

CN 1852448 A 10/2006
CN 102244669 A 11/2011
(Continued)

OTHER PUBLICATIONS

Sid Stamm et al., "Drive-By Pharming", [Online], 2007, pp. 495-506, [Retrieved from Internet on Jan. 26, 2017], <http://download.springer.com/static/pdf/963/chp%253A10.1007%252F978-3-540-77048-0_38.pdf>.*
(Continued)

Primary Examiner — Ziaul A Chowdhury
(74) Attorney, Agent, or Firm — Jun He Law Offices P.C.; James J. Zhu (57) ABSTRACT

The present disclosure relates to a method and a device for complying a router management application with a router firmware. The method includes: obtaining a current version of the router management application and a current version of the router firmware, in which a router is managed by the router management application; determining an object to be upgraded and an object not to be upgraded from the router management application and the router firmware according to the current version of the router management application and the current version of the router firmware, if the router
(Continued)

management application is not compatible with the router firmware; obtaining a target version of the object to be upgraded, in which the target version is compatible with the object not to be upgraded; and upgrading the object to be upgraded according to the target version.

9 Claims, 6 Drawing Sheets

(51) Int. Cl.
    H04L 12/24 (2006.01)
    H04L 29/08 (2006.01)
(52) U.S. Cl.
    CPC .......... *H04L 67/34* (2013.01); *H04L 41/0859* (2013.01); *H04L 41/0886* (2013.01)

(56) References Cited

U.S. PATENT DOCUMENTS

| | | | |
|---|---|---|---|
| 6,622,302 B1 | 9/2003 | Delaney et al. | |
| 6,976,163 B1* | 12/2005 | Hind | G06F 21/572 713/1 |
| 7,051,097 B1* | 5/2006 | Pecina | H04L 67/34 707/999.104 |
| 7,200,632 B1* | 4/2007 | Greschler | H04L 67/34 709/203 |
| 8,001,245 B2* | 8/2011 | Kelso | H04L 41/082 709/220 |
| 8,527,613 B2* | 9/2013 | Malone | G06F 8/65 709/220 |
| 2002/0083156 A1 | 6/2002 | Wysoczynski | |
| 2003/0005090 A1* | 1/2003 | Sullivan, Jr. | H04L 41/0816 709/220 |
| 2003/0159135 A1* | 8/2003 | Hiller | G06F 9/44536 717/166 |
| 2003/0233493 A1 | 12/2003 | Boldon et al. | |
| 2004/0010576 A1 | 1/2004 | Hyndman | |
| 2004/0230968 A1* | 11/2004 | Masunaga | H04L 29/06 717/171 |
| 2006/0070055 A1* | 3/2006 | Hodder | G06F 8/65 717/168 |
| 2006/0109797 A1* | 5/2006 | Ishida | H04L 29/12009 370/252 |
| 2007/0016901 A1* | 1/2007 | Izuta | G06F 8/65 717/168 |
| 2008/0270587 A1* | 10/2008 | Mason | H04L 41/082 709/223 |
| 2008/0320456 A1* | 12/2008 | Biswas | G06F 8/65 717/145 |
| 2009/0067347 A1* | 3/2009 | Kimura | H04L 41/0859 370/255 |
| 2009/0161679 A1* | 6/2009 | Yang | H04L 41/0873 370/395.53 |
| 2009/0318124 A1* | 12/2009 | Haughn | G06F 8/65 455/418 |
| 2011/0173599 A1* | 7/2011 | Ohama | G06F 8/65 717/168 |
| 2012/0069747 A1* | 3/2012 | Wang | H04L 41/082 370/252 |
| 2012/0272228 A1* | 10/2012 | Marndi | G06F 9/44536 717/170 |
| 2013/0191688 A1* | 7/2013 | Agarwal | H04L 41/0873 714/32 |
| 2013/0326494 A1* | 12/2013 | Nunez | H04L 41/082 717/172 |
| 2014/0040875 A1 | 2/2014 | Bower, III et al. | |
| 2014/0164622 A1* | 6/2014 | Afshin | H04L 41/082 709/226 |
| 2014/0269254 A1* | 9/2014 | Choorakkot | H04L 41/082 370/218 |
| 2014/0351584 A1* | 11/2014 | Checcucci | G06F 21/105 713/164 |
| 2015/0113172 A1* | 4/2015 | Johnson | H04L 67/34 709/245 |
| 2015/0278374 A1* | 10/2015 | Van De Poel | G06F 8/61 707/722 |
| 2016/0020970 A1* | 1/2016 | Ting | H04L 67/34 709/224 |
| 2016/0294828 A1* | 10/2016 | Zakaria | H04L 41/0886 |

FOREIGN PATENT DOCUMENTS

| | | |
|---|---|---|
| CN | 102495733 A | 6/2012 |
| CN | 102707976 A | 10/2012 |
| CN | 103856349 A | 6/2014 |
| CN | 103970566 A | 8/2014 |
| CN | 104219092 A | 12/2014 |
| EP | 2369473 A1 | 9/2011 |
| JP | 2006268203 A | 10/2006 |
| JP | 2007156960 A | 6/2007 |
| JP | 2007293514 A | 11/2007 |
| JP | 2009230398 A | 10/2009 |
| JP | 2009230400 A | 10/2009 |
| JP | 2011128702 A | 6/2011 |
| JP | 2011158928 A | 8/2011 |
| JP | 2012063975 A | 3/2012 |

OTHER PUBLICATIONS

Jungwoo Ryoo et al., "Security Education Using Second Life", [Online], 2009, pp. 71-74, [Retrieved from Internet on Jan. 26, 2016], <https://f899c06f-a-62cb3a1a-s-sites.googlegroups.com/site/angsanat/publication-1/IEEE_S_P_2009.pdf>.*
Eric Schulte et al., "Repairing COTS Router Firmware without Access to Source Code or Test Suites: A Case Study in Evolutionary Software Repair", [Online], 2015, pp. 1-8, [Retrieved from Internet on Jan. 26, 2017], <http://www.cs.virginia.edu/~weimer/p/weimer-netgear-repair-preprint.pdf>.*
Mohd Anuar Mat Isa et al., "A Lightweight and Secure TFTP Protocol for Smart Environment", [Online], 2012, pp. 302-306, [Retrieved from Internet on Jan. 26, 2017], <http://ieeexplore.ieee.org/stamp/stamp.jsp?arnumber=6482117>.*
Jungwoo Ryoo et al., "Security Education Using Second Life", [Online], 2009, pp. 71-74 [Retrieved from Internet on Sep. 24, 2017], <https://f899c06f-a-62cb3a1a-s-sites.googlegroups.com/site/angsanat/publication-1/IEEE_S_P_2009.pdf>.*
Steven Myers et al., "Practice & Prevention of Home-Router Mid-Stream Injection Attacks", [Online], 2008, pp. 1-14, [Retrieved from Interent on Sep. 24, 2017], <http://research.sidstamm.com/papers/midstreaminject.pdf>.*
Patrick Traynor et al., "Malnets: large-scale malicious networks via compromised wireless access points", [Online], 2009, pp. 1-12, [Retrieved from Internet on Sep. 24, 2017], <https://cise.ufl.edu/~butler/pubs/malnets.pdf>.*
First Office Action of CN201410429737.5 dated Jun. 1, 2015.
Second Office Action of CN201410429737.5 dated Oct. 10, 2015.
European Search Report of EP2991275 dated Jan. 22, 2016.
Notification of Reasons for Refusal of JP2016544721 dated Sep. 28, 2016.
Notification of Reasons for Refusal of KR10-2015-7014972 dated Jan. 18, 2017.
International Search Report of PCT/CN20151074627 dated Jun. 29, 2015.

* cited by examiner

METHOD AND TERMINAL DEVICE FOR COMPLYING ROUTER MANAGEMENT APPLICATION WITH ROUTER FIRMWARE

CROSS-REFERENCE TO RELATED APPLICATIONS

This application is a Continuation application of International Application No. PCT/CN2015/074627, filed with the State Intellectual Property Office of P. R. China on Mar. 19, 2015, which is based upon and claims priority to Chinese Patent Application No. 201410429737.5 filed on Aug. 27, 2014, the entire contents of which are incorporated herein by reference.

TECHNICAL FIELD

The present disclosure generally relates to the field of Internet technology, and more particularly, to a method and a terminal device for complying a router management application with a router firmware.

BACKGROUND

With the development of Internet technology, surfing the Internet has become more popular in people's lives. Sometimes, multiple terminal devices are required to be connected with the Internet using a same account. For example, in a home network, there are multiple terminal devices, such as a mobile phone, a computer and a network television, which are connected to a same router and thus connected to the Internet via the same router using the same account.

When using the router, functions of the router are required to be managed, such as performing a firmware upgrading, a password modification and so on. Currently, a router management application may be installed in a terminal device for managing the router. The router management application may manage the functions of the router remotely, for example, the router management application may remotely control the router to perform the firmware upgrading or the password modification.

Moreover, the router management application in the terminal device may be upgraded, and the router firmware may also be upgraded. When a version of the router management application in the terminal device is not matched with a version of the router firmware, some functions of the router may not be accomplished. For example, if the version of the router management application is upgraded but the version of the router firmware is not upgraded accordingly, then some functions of the router management application does not exist in the router, and thus the user cannot control the router to run these functions by using the router management application.

SUMMARY

Accordingly, embodiments of the present disclosure provide a method and a terminal device for complying a router management application with a router firmware.

According to embodiments of a first aspect of the present disclosure, a method for complying a router management application with a router firmware is provided. The method includes: obtaining a current version of the router management application and a current version of the router firmware, in which a router is managed by the router management application; determining an object to be upgraded and an object not to be upgraded from the router management application and the router firmware according to the current version of the router management application and the current version of the router firmware, if the router management application is not compatible with the router firmware; obtaining a target version of the object to be upgraded, in which the target version is compatible with the object not to be upgraded; and upgrading the object to be upgraded according to the target version.

According to embodiments of a second aspect of the present disclosure, a terminal device for complying a router management application with a router firmware is provided. The terminal device includes: a processor; a memory configured to store instructions executable by the processor; wherein the processor is configured to: obtaining a current version of the router management application and a current version of the router firmware, wherein a router is managed by the router management application; determining an object to be upgraded and an object not to be upgraded from the router management application and the router firmware according to the current version of the router management application and the current version of the router firmware, if the router management application is not compatible with the router firmware; obtaining a target version of the object to be upgraded, wherein the target version is compatible with the object not to be upgraded; and upgrading the object to be upgraded according to the target version.

According to embodiments of a third aspect of the present disclosure, a non-transitory computer-readable storage medium is provided. The non-transitory computer-readable storage medium has stored therein instructions that, when executed by a processor of a terminal device, causes the terminal device to perform a method for complying a router management application with a router firmware, the method comprising: obtaining a current version of the router management application and a current version of the router firmware, wherein a router is managed by the router management application; determining an object to be upgraded and an object not to be upgraded from the router management application and the router firmware according to the current version of the router management application and the current version of the router firmware, if the router management application is not compatible with the router firmware; obtaining a target version of the object to be upgraded, wherein the target version is compatible with the object not to be upgraded; and upgrading the object to be upgraded according to the target version.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

In order to make objectives, technical solutions and advantages of the present disclosure more clearly understood, the present disclosure will now be explained in detail with reference to exemplary embodiments and accompanying drawings. Herein, the exemplary embodiments and explanation thereof are used to illustrate the present disclosure, but not used to limit the scope of the present disclosure.

Embodiments of the present disclosure provide a method and a terminal device for complying a router management application with a router firmware, which will be described in detail with reference to the accompanying drawings in the following.

Figure 1:
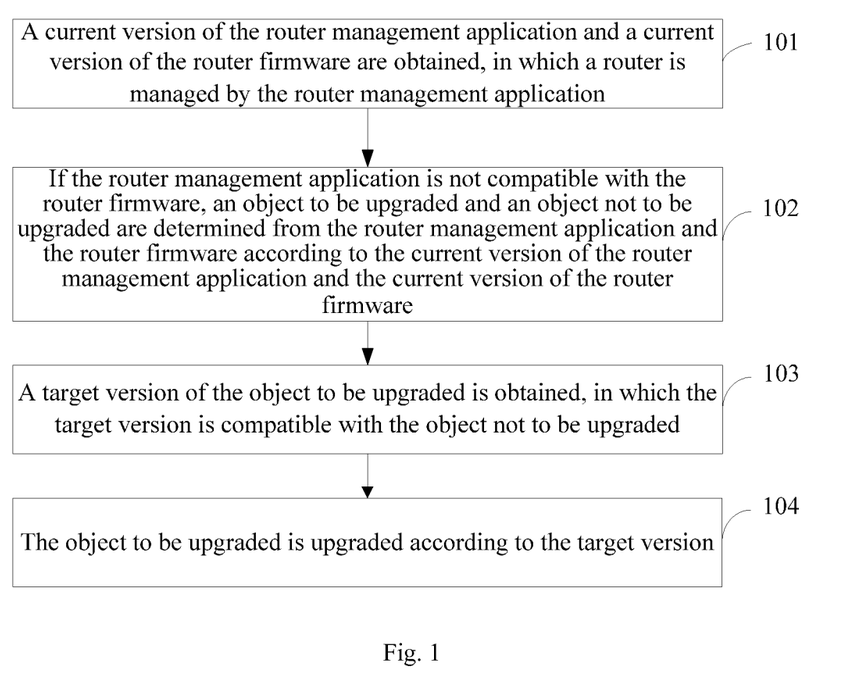
FIG. 1 is a flow chart of a method for complying a router management application with a router firmware according to an exemplary embodiment.

FIG. 1 is a flow chart of a method for complying a router management application with a router firmware according to an exemplary embodiment. As shown in FIG. 1, the method for complying a router management application with a router firmware is applied in a terminal device and includes the following steps.

In step 101, a current version of the router management application and a current version of the router firmware are obtained, in which a router is managed by the router management application.

In step 102, if the router management application is not compatible with the router firmware, an object to be upgraded and an object not to be upgraded are determined from the router management application and the router firmware according to the current version of the router management application and the current version of the router firmware.

In step 103, a target version of the object to be upgraded is obtained, in which the target version is compatible with the object not to be upgraded.

In step 104, the object to be upgraded is upgraded according to the target version.

Selectively, the step of obtaining the current version of the router firmware includes: obtaining a user identification of the router, obtaining a firmware version of the router bound to the user identification from a server, and determining the firmware version as the current version of the router firmware.

Alternatively, the step of obtaining the current version of the router firmware can also include: obtaining an identification of the router from the router management application, and obtaining the current version of the router firmware from the router according to the identification of the router.

Selectively, the step of determining the object to be upgraded and the object not to be upgraded from the router management application and the router firmware according to the current version of the router management application and the current version of the router firmware includes: obtaining a router firmware version of the router compatible with the router management application corresponding to a correlation between versions of the router management application and versions of the router firmware according to the current version of the router management application; determining the router firmware as the object to be upgraded and determining the router management application as the object not to be upgraded, if the router firmware version is higher than the current version of the router firmware; determining the router management application as the object to be upgraded and determining the router firmware as the object not to be upgraded, if the router firmware version is lower than the current version of the router firmware.

Alternatively, the step of determining the object to be upgraded and the object not to be upgraded from the router management application and the router firmware according to the current version of the router management application and the current version of the router firmware can also include: determining a version range of the router management application comprising the current version of the router management application; obtaining a version range of the router firmware compatible with the router management application corresponding to a correlation between version ranges of the router management application and version ranges of the router firmware according to the version range of the router management application; determining the router firmware as the object to be upgraded and determining the router management application as the object not to be upgraded, if a lower limit of the version range of the router firmware is higher than the current version of the router firmware; determining the router management application as the object to be upgraded and determining the router firmware as the object not to be upgraded, if an upper limit of the version range of the router firmware is lower than the current version of the router firmware.

Selectively, the step of obtaining the target version of the object to be upgraded includes: obtaining versions of the object to be upgraded compatible with the object not to be upgraded; and selecting one version from the versions of the object to be upgraded, and using the selected version as the target version.

In embodiments of the present disclosure, the current version of the router management application and the current version of the router firmware are obtained, and if the router management application is not compatible with the router firmware, the object to be upgraded and the object not to be upgraded are determined according to the current version of the router management application and the current version of the router firmware, the target version of the object to be upgraded compatible with the object not to be upgraded is obtained, and the object to be upgraded is upgraded according to the target version, such that the router management application is compatible with the router firmware. In this way, a user may manage the router using the router management application.

Figure 2:
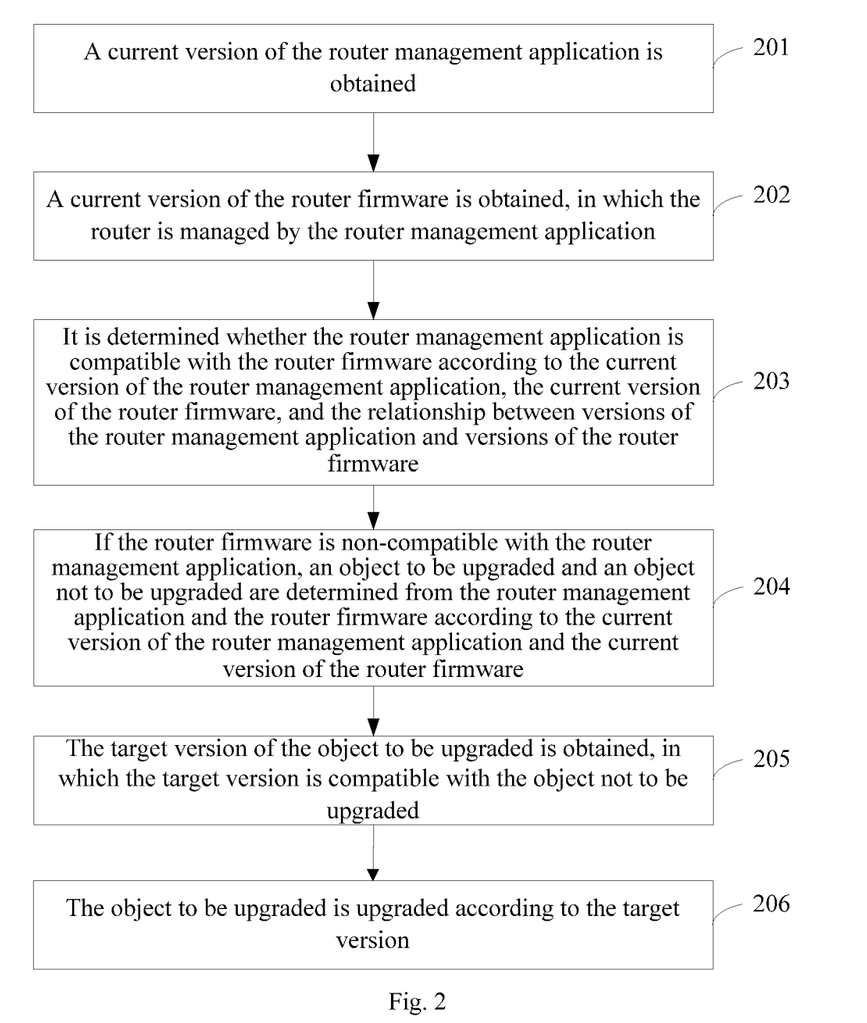
FIG. 2 is a flow chart of a method for complying a router management application with a router firmware according to an exemplary embodiment.

FIG. 2 is a flow chart of a method for complying a router management application with a router firmware according to an exemplary embodiment. As shown in FIG. 2, the method for complying a router management application with a router firmware is applied in a terminal device and includes the following steps.

In step 201, a current version of the router management application is obtained. The method in this embodiment may be applied in the terminal device. The terminal device may be a mobile phone, a personal computer, a PAD, a router or any other kind of terminal device.

In practice, the terminal device obtains the current version of the router management application from the router management application.

In step 202, a current version of the router firmware is obtained, in which the router is managed by the router management application. The method in this embodiment may be applied in the terminal device.

This step may be implemented in two ways as follows, i.e., Way 1 and Way 2.

In Way 1, a user identification of a user is obtained, and a firmware version of the router bound to the user identification is obtained from a server and is determined as the current version of the router firmware, in which the user identification is stored in the router management application and is used to identify the user.

In the router management application, each user corresponds to one user identification, and also corresponds to one or more routers. All of the routers which correspond to the user are managed by the router management application.

Before executing this step, the server stores the user identification corresponding to the user and the identifications and firmware versions of the one or more router corresponding to the user, and generates a correlation between user identifications, router identifications and firmware versions of the router, so as to bind the user identification to the router corresponding to the user.

The server may bind the user identification to the router corresponding to the user in following two cases.

(1) When the user has a new router and registers the new router in the server, the server receives a registration request sent by the user, in which the registration request carries the user identification, and the identification and firmware version of the router. The server stores the user identification and the identification and firmware version of the router, and generates a correlation between user identifications, router identifications and firmware versions of the router.

(2) When the firmware of the router corresponding to the user is upgraded, the server obtains the user identification of the user, the identification of the router, and the upgraded firmware version of the router, and obtains the firmware version of the router corresponding to the correlation between user identifications, router identifications and firmware versions of the router according to the user identification and the router identification. The server updates the firmware version of the router to the upgraded firmware version of the router.

In practice, the terminal device sends an obtaining request to the server, in which the obtaining request carries the user identification. The server obtains the firmware version of the router from the correlation between user identifications, router identifications and firmware versions of the router stored in the server according to the user identification, and sends the firmware version of the router to the terminal device. The terminal device receives the firmware version of the router sent by the server, and uses the received firmware version of the router as the firmware version of the router managed by the router management application.

In Way 2, the identification of the router is obtained from the router management application, and the current version of the router firmware is obtained from the router according to the identification of the router.

Given that the router management application is used to manage the router, the router management application has the identification and current firmware version of the router managed by the router management application.

In practice, the terminal device obtains the identification of the router managed by the router management application from the router management application, and sends a request instruction to the router according to the identification of the router, in which the request instruction is used to obtain the current version of the router firmware. When receiving the request instruction, the router sends the current firmware version of the router to the terminal device, and then the terminal device receives the current firmware version of the router.

In step 203, it is determined whether the router management application is compatible with the router firmware according to the current version of the router management application, the current version of the router firmware, and the correlation between versions of the router management application and versions of the router firmware. The method in this embodiment may be applied in the terminal device.

In practice, the firmware version of the router compatible with the router management application is obtained corresponding to the correlation between versions of the router management application and versions of the router firmware according to the current version of the router management application. If the firmware version of the router includes the current version of the router firmware, it is determined that the router management application is compatible with the router firmware. If the firmware version of the router does not include the current version of the router firmware, it is determined that the router management application is not compatible with the router firmware.

Before executing this step, the terminal device obtains the correlation between versions of the router management application and versions of the router firmware from the server. The terminal device may obtain the correlation in two ways as follows, i.e., Way 1 and Way 2.

In Way 1, before executing this step, the terminal device actively obtains the correlation between versions of the router management application and versions of the router firmware from the server.

For example, after executing step 202 and before executing step 203, the terminal device may actively obtain the correlation between versions of the router management application and versions of the router firmware from the server. Alternatively, as soon as the router management application is used to manage the router, the terminal device actively obtains and stores the correlation between versions of the router management application and versions of the router firmware from the server.

In Way 2, when there is a new version of the router management application or a new version of the router firmware, the terminal device receives and stores the correlation between versions of the router management application and versions of the router firmware actively sent by the server.

For example, assuming that the correlation between versions of the router management application and versions of the router firmware as shown in Table 1 is stored in the terminal device, and assuming that the current version of the router management application is APP V0.5, according to the current version of the router management application and the correlation between versions of the router management application and versions of the router firmware, it will be obtained that the firmware version of the router compatible with the router management application includes ROM V1.0, ROM V1.1, and ROM V1.2.

TABLE 1

| version of the router management application | version of the router firmware |
| --- | --- |
| APP V0.3 | ROM V0.9 |
| APP V0.4, APP V0.5, APP V0.6 | ROM V1.0, ROM V1.1, ROM V1.2 |
| APP V0.7, APP V0.8 | ROM V1.3, ROM V1.4 |

For example, assuming that the current firmware version of the router managed by the router management application is ROM V1.3, and the obtained firmware version of the router compatible with the router management application includes ROM V1.0, ROM V1.1, and ROM V1.2, the obtained firmware version does not include the current firmware version of the router (i.e., ROM V1.3), and thus it is determined that the router firmware is not compatible with the router management application.

In step 204, if the router firmware is not compatible with the router management application, an object to be upgraded and an object not to be upgraded are determined from the router management application and the router firmware according to the current version of the router management application and the current version of the router firmware. The method in this embodiment may be applied in the terminal device.

In practice, according to the current version of the router management application, the firmware version of the router compatible with the router management application is obtained from the correlation between versions of the router management application and versions of the router firmware; if obtained firmware version is higher than the current version of the router firmware, the router firmware is determined as the object to be upgraded and the router management application is determined as the object not to be upgraded; if obtained firmware version is lower than the current version of the router firmware, the router management application is determined as the object to be upgraded and the router firmware is determined as the object not to be upgraded.

For example, according to the current version APP V0.5 of the router management application, from the correlation between versions of the router management application and versions of the router firmware as shown in Table 1, it is obtained that the firmware version of the router compatible with the router management application includes ROM V1.0, ROM V1.1, and ROM V1.2, in which each of the firmware versions ROM V1.0, ROM V1.1, and ROM V1.2 is lower than the current version of the router firmware ROM V1.3, and thus the router management application is determined as the object to be upgraded and the router firmware is determined as the object not to be upgraded.

In step 205, the target version of the object to be upgraded is obtained, in which the target version is compatible with the object not to be upgraded. The method in this embodiment may be applied in the terminal device.

In practice, if the object not to be upgraded is the router management application and the object to be upgraded is the router firmware, firmware versions of the router compatible with the router management application are obtained corresponding to the correlation between versions of the router management application and versions of the router firmware according to the current version of the router management application, and one firmware version is selected from the firmware versions of the router compatible with the router management application, for example, one firmware version is selected randomly from the firmware versions of the router compatible with the router management application, particularly, the lowest firmware version or the highest firmware version is selected, and then the selected firmware version is used as the target version of the router firmware compatible with the router management application.

If the object not to be upgraded is the router firmware and the object to be upgraded is the router management application, versions of the router management application compatible with the router firmware are obtained corresponding to the correlation between versions of the router management application and versions of the router firmware according to the current version of the router firmware, and one version is selected from versions of the router management application compatible with the router firmware, for example, one version is selected randomly from the versions of the router management application compatible with the router firmware, and particularly, the lowest version or the highest version is selected, and then the selected version is used as the target version of the router management application compatible with the router firmware.

For example, the current version of the router firmware is ROM V1.3, versions of the router management application compatible with the router firmware include APP V 0.7 and APP V0.8, one version is selected from versions APP V 0.7 and APP V0.8 of the router management application (assuming that version APP V0.8 is selected), and then version APP V0.8 is used as the target version of the router management application compatible with the router firmware.

In step 206, the object to be upgraded is upgraded according to the target version. The method in this embodiment may be applied in the terminal device.

In practice, if the object not to be upgraded is the router management application and the object to be upgraded is the router firmware, then the target version is the version of the router firmware, an installation package of the router firmware corresponding to the target version is downloaded according to the target version, and the installation package of the router firmware is installed on the router, such that the router firmware is upgraded. If the object not to be upgraded is the router firmware and the object to be upgraded is the router management application, then the target version is the version of the router management application, an installation package of the router management application corresponding to the target version is downloaded according to the target version, and the installation package of the router management application is installed on the router or the terminal device, such that the router management application is upgraded.

In embodiments of the present disclosure, the router management application may be installed on the router or on the terminal device. When the router management application is installed on the router, the terminal device may mange the router by controlling the router management application installed on the router.

In this embodiment, it may be determined by the server whether the router management application is compatible with the router firmware, and if no, it is possible to make the router management application compatible with the router firmware in following ways.

The server receives the current version of the router management application and the user identification of the user from the terminal device, in which the user identification is used to identify the user in the router management application. The server obtains the current version of the router firmware bound to the user identification according to the user identification, in which the router is managed by the router management application. The server obtains the firmware version of the router compatible with the router management application corresponding to the correlation between versions of the router management application and versions of the router firmware stored in the server according to the current version of the router management application. The server determines whether the router management application is compatible with the router firmware according to the firmware version of the router, and if no, the server determines the object to be upgraded and the object not to be upgraded according to the current version of the router management application and the current version of the router firmware, and obtains the target version of the object to be upgraded compatible with the object not to be upgraded. The server upgrades the object to be upgraded according to the target version, such that the router management application is compatible with the router firmware.

In embodiments of the present disclosure, the current version of the router management application and the current version of the router firmware are obtained, the firmware version of the router compatible with the router management application is obtained corresponding to the correlation between versions of the router management application and versions of the router firmware, it is determined whether the router management application is compatible with the router firmware according to the obtained firmware version, if no, the object to be upgraded and the object not to be upgraded are determined according to the current version of the router firmware and the current version of the router management application, the target version of the object to be upgraded compatible with the object not to be upgraded is obtained, and the object to be upgraded is upgraded according to the target version, such that the router management application is compatible with the router firmware. In this way, the user may manage the router more efficient using the router management application.

Figure 3A:
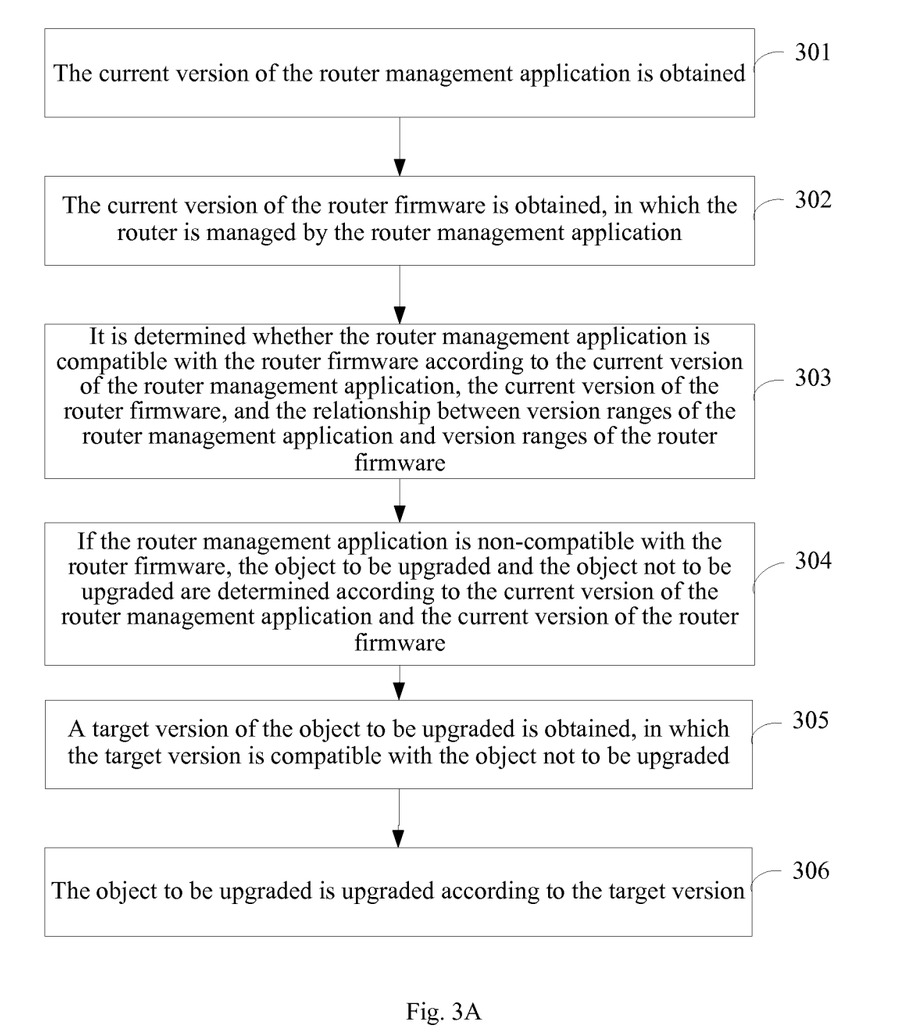
FIG. 3A is a flow chart of a method for complying a router management application with a router firmware according to an exemplary embodiment.

FIG. 3A is a flow chart of a method for complying a router management application with a router firmware according to an exemplary embodiment. As shown in FIG. 3A, the method for complying the router management application with the router firmware is applied in a terminal device and includes following steps.

In step 301, a current version of the router management application is obtained. The method in this embodiment may be applied in the terminal device and the terminal device may be a mobile phone, a personal computer, a PAD, a router or any other kind of terminal device.

In practice, the terminal device obtains the current version of the router management application from the router management application.

In step 302, the current version of the router firmware is obtained, in which the router is managed by the router management application. The method in this embodiment may be applied in the terminal device.

This step may be implemented in two ways as follows, i.e., Way 1 and Way 2.

In Way 1, a user identification of a user is obtained, and a firmware version of the router bound to the user identification is obtained from a server and is determined as the current version of the router firmware, in which the user identification is stored in the router management application and is used to identify the user.

In the router management application, each user corresponds to one user identification, and also corresponds to one or more routers. All the routers corresponding to the user are managed by the router management application.

Before executing this step, the server stores the user identification corresponding to the user and the identifications and firmware versions of the one or more routers corresponding to the user, and generates a correlation between user identifications, router identifications and firmware versions of the router.

The server may bind the user identification with the router corresponding to the user in following two cases.

(1) When the user has a new router and registers the new router in the server, the server receives a registration request sent by the user, in which the registration request carries the user identification, and the identification and firmware version of the router. The server stores the user identification and the identification and firmware version of the router, and generates the correlation between user identifications, router identifications and firmware versions of the router.

(2) When the firmware of the router corresponding to the user is upgraded, the server obtains the user identification of the user, the identification of the router, and the upgraded firmware version of the router, obtains the firmware version of the router from the correlation between user identifications, router identifications and firmware versions of the router according to the user identification and the router identification, and updates the firmware version of the router to be the upgraded firmware version of the router.

In practice, the terminal device sends an obtaining request to the server, in which the obtaining request carries the user identification. The server obtains the firmware version of the router from the correlation between user identifications, router identifications and firmware versions of the router stored in the server according to the user identification, and sends the firmware version of the router to the terminal device. The terminal device receives the firmware version of the router sent by the server, and uses the received firmware version of the router as the firmware version of the router managed by the router management application.

In Way 2, the identification of the router is obtained from the router management application, and the current version of the router firmware is obtained from the router according to the identification of the router.

Given that the router management application is used to manage the router, the router management application has the identification and current firmware version of the router managed by the router management application.

In practice, the terminal device obtains the identification of the router managed by the router management application from the router management application, and sends a request instruction to the router according to the identification of the router, in which the request instruction is used to obtain the current version of the router firmware. When receiving the request instruction, the router sends the current firmware version of the router to the terminal device, and then the terminal device receives the current firmware version of the router.

In step 303, it is determined whether the router management application is compatible with the router firmware according to the current version of the router management application, the current version of the router firmware, and the correlation between version ranges of the router management application and version ranges of the router firmware. The method in this embodiment may be applied in the terminal device.

In practice, a version range of the router management application including the current version of the router management application is determined, and a version range of the router firmware compatible with the router management application is obtained corresponding to the correlation between the version range of the router management application and the version range of the router firmware according to the version range of the router management application. If the version range of the router firmware includes the current version of the router firmware, it is determined that the router management application is compatible with the router firmware. If the version range of the router firmware does not include the current version of the router firmware, it is determined that the router management application is not compatible with the router firmware.

Figure 3B:
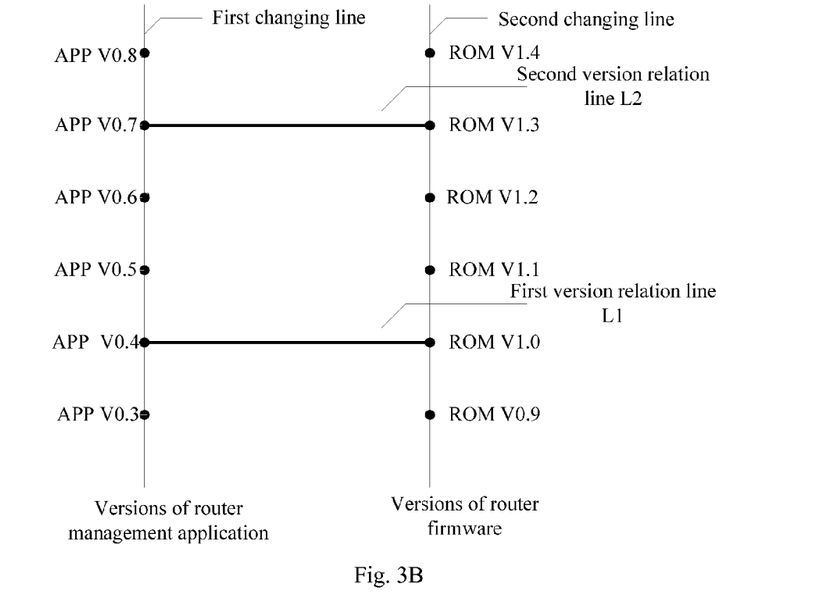
FIG. 3B is a schematic diagram showing version compatibility according to an exemplary embodiment.

In embodiments of the present disclosure, the correlation between version ranges of the router management application and version ranges of the router firmware may be represented in a form of diagram. For example, the diagram may be a version compatibility diagram, which includes a first changing line, a second changing line and at least one version relation line. The first changing line includes multiple points and each point corresponds to one version of the router management application. The second changing line includes multiple points and each point corresponds to one firmware version of the router. One end of the version relation line is connected with a point on the first changing line, and the version of the router management application corresponding to the point is a critical application version. The other end of the version relation line is connected with a point on the second changing line, and the firmware version corresponding to the point is a critical firmware version. The router management application lower than the critical application version is not compatible with the router firmware higher than or equal to the critical firmware version, and the router firmware lower than the critical firmware version is not compatible with the router management application higher than or equal to the critical application version.

In the version compatibility diagram, the version relation line divides the versions of the router management application on the first changing line into multiple version ranges of the router management application, and divides the versions of the router firmware on the second changing line into multiple version ranges of the router firmware. There is a one-to-one correspondence between the version ranges of the router management application and the version ranges of the router firmware located on a same side of the version relation line, or there is a one-to-one correspondence between the version ranges of the router management application and the version ranges of the router firmware located between adjacent version relation lines.

For example, the version compatibility diagram shown in FIG. 3B includes a first changing line, a second changing line and two version relation lines, and the two version relation lines includes a first version relation line L1 and a second version relation line L2. The first changing line includes multiple points, and each point corresponds to one version of the router management application, wherein the versions are APP V0.3, APP V0.4, APP V0.5, APP V0.6, APP V0.7 and APP V0.8 respectively. The second changing line includes multiple points, and each point corresponds to one firmware version of the router, wherein in the versions are ROM V0.9, ROM V1.0, ROM V1.1, ROM V1.2, ROM V1.3 and ROM V1.4 respectively.

One end of the first version relation line L1 is connected with a point on the first changing line, and the version APP V0.4 of the router management application corresponding to this point is the critical application version. The other end of the first version relation line L1 is connected with a point on the second changing line, and the firmware version ROM V1.0 of the router corresponding to this point is the critical firmware version. One end of the second version relation line L2 is connected with a point on the first changing line, and the version APP V0.7 of the router management application corresponding to this point is the critical application version. The other end of the second version relation line is connected with a point on the second changing line, and the firmware version ROM V1.3 of the router corresponding to this point is the critical firmware version.

In the version compatibility diagram shown in FIG. 3B, the first version relation line L1 and the second version relation line L2 divide the versions of the router management application on the first changing line into three version ranges of the router management application, which are a first application version range lower than APP V0.4, a second application version range higher than or equal to APP V0.4 and lower than APP V0.7, and a third application version range higher than or equal to APP V0.7, and the first version relation line L1 and the second version relation line L2 divide the firmware versions of the router on the second changing line into three firmware version ranges, which are a first firmware version range lower than ROM V1.0, a second firmware version range higher than or equal to ROM V1.0 and lower than ROM V1.3, and a third firmware version range higher than or equal to ROM V 1.3. There are a one-to-one correspondence between the first application version range and the first firmware version range, a one-to-one correspondence between the second application version range and the second firmware version range, and a one-to-one correspondence between the third application version range and the third firmware version range.

Before executing this step, the terminal device firstly obtains the version compatibility diagram from the server. The terminal device may obtain the version compatibility diagram in two ways as follows, i.e., Way 1 and Way 2.

In Way 1, before executing this step, the terminal device actively obtains the version compatibility diagram from the server.

For example, after executing step 302 and before executing step 303, the terminal device may actively obtain the version compatibility diagram from the server. Alternatively, as soon as the router management application is used to manage the router, the terminal device actively obtains and stores the version compatibility diagram from the server.

In Way 2, when there is a new version of the router management application or a new version of the router firmware, the terminal device receives and stores the version compatibility diagram sent actively by the server.

This step may include: drawing a connection line connecting the current version of the router management application with the current version of the router firmware on the version compatibility diagram according to the current version of the router management application and the current version of the router firmware, determining that the router management application is non-compatible with the router firmware if the connection line intersects the version relation line in the version compatibility diagram, and determining that the router management application is compatible with the router firmware if the connection line does not intersect the version relation line in the version compatibility diagram.

Figure 3C:
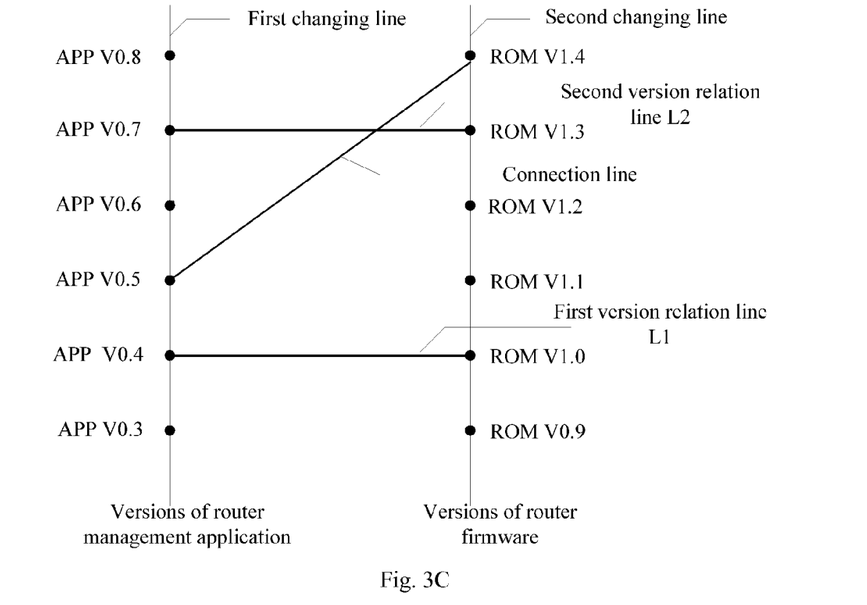
FIG. 3C is a schematic diagram showing that versions are determined to be compatible with each other according to version compatibility according to an exemplary embodiment.

For example, as shown in FIG. 3C, assuming that the current version of the router management application is APP V0.5 and the current version of the router firmware is ROM V1.4, the connection line connecting the current version APP V0.5 of the router management application with the current version ROM V1.4 of the router firmware is drawn on the version compatibility diagram, and the connection line intersects the second version relation line L2, the router management application is non-compatible with the router firmware.

Figure 3D:
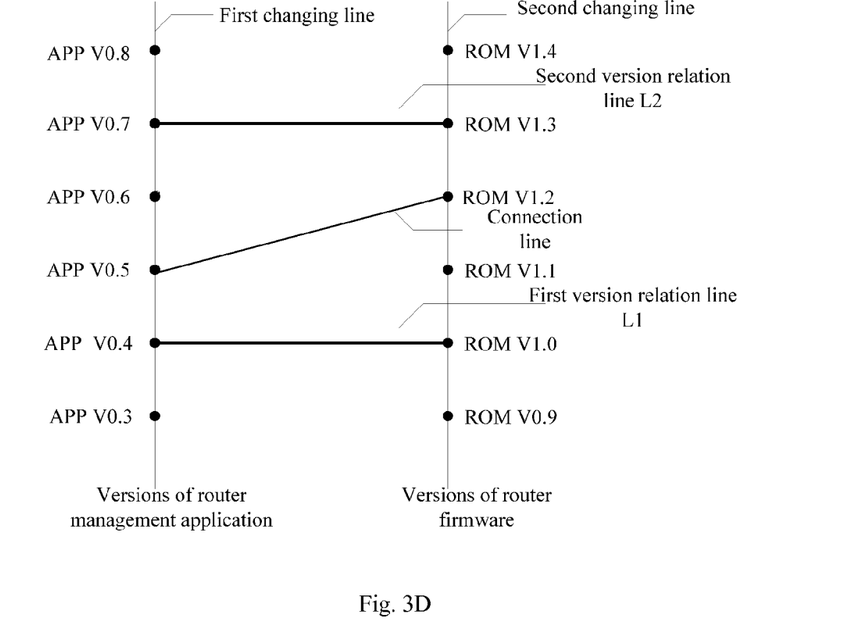
FIG. 3D is a schematic diagram showing that versions are determined to be non-compatible with each other according to version compatibility according to an exemplary embodiment.

For another example, as shown in FIG. 3D, assuming that the current version of the router management application is APP V0.5 and the current version of the router firmware is ROM V1.2, the connection line connecting the current version APP V0.5 of the router management application with the current version ROM V1.2 of the router firmware is drawn on the version compatibility diagram, and the connection line neither intersects the first version relation line L1 nor intersects the second version relation line L2, the router management application is compatible with the router firmware.

In step 304, if the router management application is not compatible with the router firmware, the object to be upgraded and the object not to be upgraded are determined according to the current version of the router management application and the current version of the router firmware. The method in this embodiment may be applied in the terminal device.

In practice, the version range of the router firmware compatible with the router management application is obtained corresponding to the correlation between the version ranges of the router management application and the version ranges of the router firmware according to the current version of the router management application; if a lower limit of the version range of the router firmware is higher than the current version of the router firmware, the router firmware is determined as the object to be upgraded and the router management application is determined as the object not to be upgraded; if an upper limit of the version range of the router firmware is lower than the current version of the router firmware, the router management application is determined as the object to be upgraded and the router firmware is determined as the object not to be upgraded.

For example, assuming that the current version of the router management application is APP V0.5 and the current version of the router firmware is ROM V1.4, the version range of the router management application including the current version APP V0.5 of the router management application is the second application version range, and the second firmware version range corresponding to the second application version range is obtained, in which the second firmware version range is higher than or equal to ROM V1.0 and lower than ROM V1.3, the current version ROM V1.4 of the router firmware is higher than the upper limit of the second firmware version range, and thus it is determined that the router management application is the object to be upgraded and the router firmware is the object not to be upgraded.

In step 305, a target version of the object to be upgraded is obtained, in which the target version is compatible with the object not to be upgraded. The method in this embodiment may be applied in the terminal device.

In practice, if the object not to be upgraded is the router management application and the object to be upgraded is the router firmware, then the version range of the router management application including the current version of the router management application is determined, the corresponding firmware version range of the router is obtained corresponding to the correlation between the version ranges of the router management application and the version ranges of the router firmware according to the version range of the router management application, and one firmware version is selected from firmware versions included in the firmware version range, for example, one firmware version is selected randomly from firmware versions included in the version range of the router firmware, particularly, the lowest firmware version or the highest firmware version is selected, and the selected firmware version is used as the target version of the router firmware compatible with the router management application.

If the object not to be upgraded is the router firmware and the object to be upgraded is the router management application, then the firmware version range of the router including the current version of the router firmware is determined, the corresponding version range of the router management application is obtained corresponding to the correlation between the version ranges of the router management application and the version ranges of the router firmware according to the firmware version range of the router, and one version is selected from versions of the router management application included in the version range of the router management application, for example, one version is selected randomly from versions of the router management application included in the version range of the router management application, particularly, the lowest version or the highest version is selected, and the selected version is used as the target version of the router management application compatible with the router firmware.

In step 306, the object to be upgraded is upgraded according to the target version. The method in this embodiment may be applied in the terminal device.

In practice, if the object not to be upgraded is the router management application and the object to be upgraded is the router firmware, then the target version is the firmware version of the router, an installation package of the router firmware corresponding to the target version is downloaded according to the target version, and the installation package of the router firmware is installed on the router, such that the router firmware is upgraded. If the object not to be upgraded is the router firmware and the object to be upgraded is the router management application, the target version is the version of the router management application, an installation package of the router management application corresponding to the target version is downloaded according to the target version, and the installation package of the router management application is installed on the router or on the terminal device, such that the router management application is upgraded.

In this embodiment, it may be determined by the server whether the router management application is compatible with the router firmware, and if no, it is possible to make the router management application compatible with the router firmware in following ways.

The server receives the current version of the router management application and the user identification of the user from the terminal device, in which the user identification is used to identify the user in the router management application. The server obtains the current version of the router firmware bound to the user identification according to the user identification, in which the router is managed by the router management application. The server determines whether the router management application is compatible with the router firmware according to the current version of the router management application, the current version of the router firmware, and the correlation between version ranges of the router management application and version ranges of the router firmware, and if no, the server determines the object to be upgraded and the object not to be upgraded according to the current version of the router management application and the current version of the router firmware, obtains the target version of the object to be upgraded compatible with the object not to be upgraded, and upgrades the object to be upgraded according to the target version, such that the router management application is compatible with the router firmware.

In embodiments of the present disclosure, the current version of the router management application and the current version of the router firmware are obtained, it is determined whether the router management application is compatible with the router firmware according to the current version of the router management application, the current version of the router firmware and the correlation between version ranges of the router management application and version ranges of the router firmware, if no, the object to be upgraded and the object not to be upgraded are obtained according to the current version of the router firmware and the current version of the router management application, the target version of the object to be upgraded compatible with the object not to be upgraded is obtained, and the object to be upgraded is upgraded according to the target version, such that the router management application is compatible with the router firmware. In this way, it is possible to determine whether the router management application is compatible with the router firmware more quickly and more intuitively, and thus the user may manage the router more efficient using the router management application.

Figure 4:
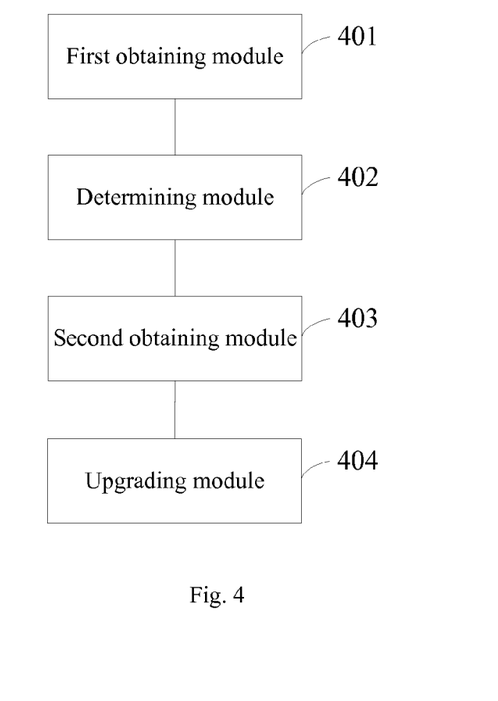
FIG. 4 is a block diagram of an apparatus for complying a router management application with a router firmware according to an exemplary embodiment.

FIG. 4 is a block diagram of an apparatus for complying a router management application with a router firmware according to an exemplary embodiment. As shown in FIG. 4, the apparatus includes a first obtaining module 401, a determining module 402, a second obtaining module 403 and an upgrading module 404.

The first obtaining module 401 is configured to obtain a current version of the router management application and a current version of the router firmware. The determining module 402 is configured to determine an object to be upgraded and an object not to be upgraded from the router management application and the router firmware according to the current version of the router management application and the current version of the router firmware, if the router management application is not compatible with the router firmware.

The second obtaining module 403 is configured to obtain a target version of the object to be upgraded, in which the target version is compatible with the object not to be upgraded.

The upgrading module 404 is configured to upgrade the object to be upgraded according to the target version.

Alternatively, the first obtaining module 401 includes: a first obtaining unit, configured to obtain a user identification of the router, to obtain a firmware version of the router bound to the user identification from a server, and to determine the firmware version as the current version of the router firmware; or a second obtaining unit, configured to obtain an identification of the router from the router management application, and to obtain the current version of the router firmware from the router according to the identification of the router.

Alternatively, the determining module 402 includes: a third obtaining unit, configured to obtain a firmware version of the router compatible with the router management application corresponding to a correlation between versions of the router management application and versions of the router firmware according to the current version of the router management application; a first determining unit, configured to determine the router firmware as the object to be upgraded and determine the router management application as the object not to be upgraded, if the router firmware version is higher than the current version of the router firmware; and a second determining unit, configured to determine the router management application as the object to be upgraded and determine the router firmware as the object not to be upgraded, if the router firmware version is lower than the current version of the router firmware.

Alternatively, the determining module 402 includes: a third determining unit, configured to determine a version range of the router management application including the current version of the router management application; a third obtaining unit, configured to obtain a version range of the router firmware compatible with the router management application corresponding to a correlation between version ranges of the router management application and version ranges of the router firmware according to the version range of the router management application; a fourth determining unit, configured to determine the router firmware as the object to be upgraded and determine the router management application as the object not to be upgraded, if a lower limit of the version range of the router firmware is higher than the current version of the router firmware; and a fifth determining unit, configured to determine the router management application as the object to be upgraded and determine the router firmware as the object not to be upgraded, if an upper limit of the version range of the router firmware is lower than the current version of the router firmware.

Alternatively, the second obtaining module 403 includes: a fourth obtaining unit, configured to obtain versions of the object to be upgraded compatible with the object not to be upgraded; and a selecting unit, configured to select one version from the versions of the object to be upgraded, and to use the selected version as the target version.

With respect to the apparatuses in the above embodiments, the specific operation modes of individual modules therein have been described in detail in the embodiments regarding the methods for making the router management application compatible with the router firmware, which will not be elaborated herein.

In embodiments of the present disclosure, the current version of the router management application and the current version of the router firmware are obtained, and if the router management application is not compatible with the router firmware, the object to be upgraded and the object not to be upgraded are determined according to the current version of the router management application and the current version of the router firmware, the target version of the object to be upgraded compatible with the object not to be upgraded is obtained, and the object to be upgraded is upgraded according to the target version, such that the router management application is compatible with the router firmware. In this way, the user may manage the router using the router management application.

Figure 5:
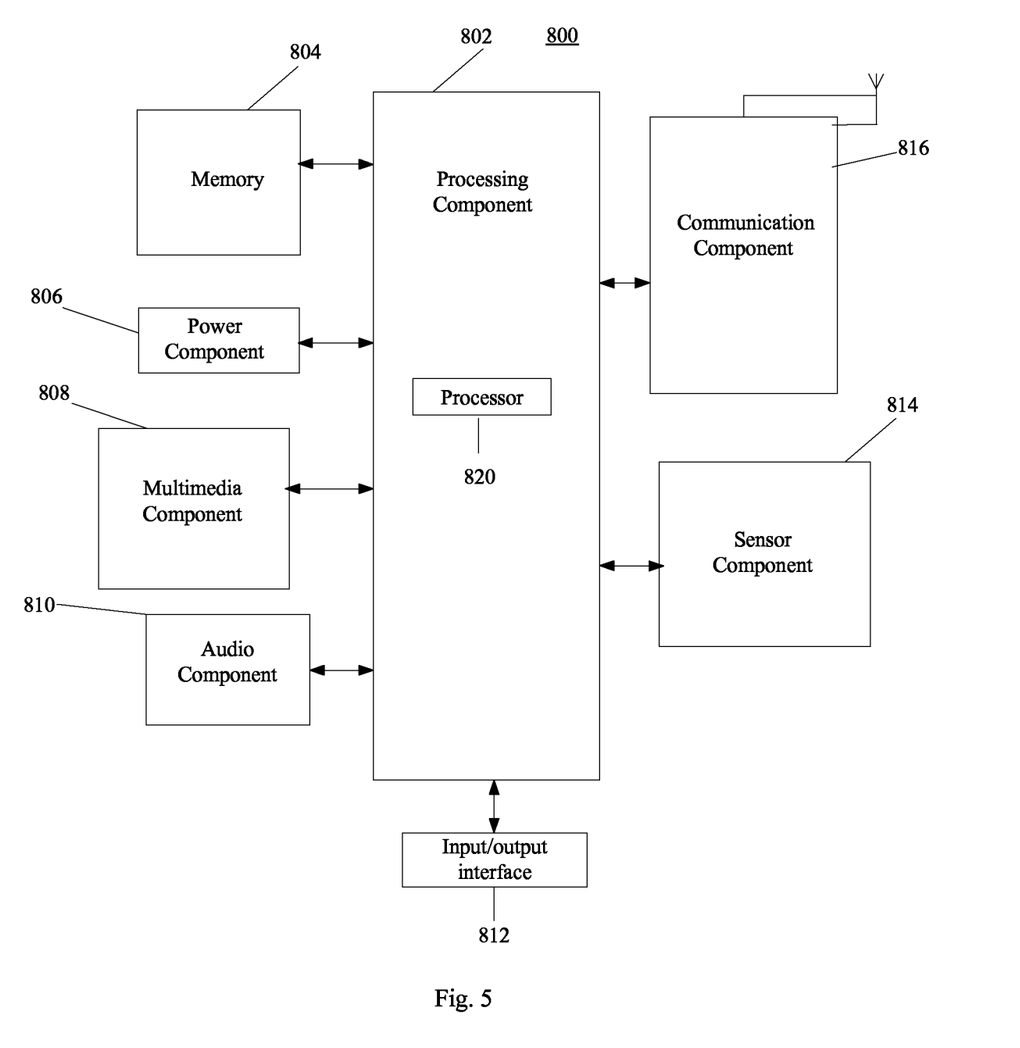
FIG. 5 is a block diagram of a terminal device according to an exemplary embodiment.

FIG. 5 is a block diagram of a terminal device 800 according to an exemplary embodiment. For example, the terminal device 800 may be a mobile phone, a computer, a digital broadcast terminal, a message transceiver, a game console, a tablet, a medical device, an exercise equipment, a personal digital assistant, and the like.

Referring to FIG. 5, the terminal device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the terminal device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the terminal device 800. Examples of such data include instructions for any applications or methods operated on the terminal device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal device 800. The power component 806 may include a power management system, one or more power sources, and any other components associated with the generation, management, and distribution of power in the terminal device 800.

The multimedia component 808 includes a screen providing an output interface between the terminal device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and other gestures on the touch panel. The touch sensors may not only sense a boundary of a touch or swipe action, but also sense a duration time and a pressure associated with the touch or swipe action. In some embodiments, the multimedia component 808 includes a front camera and/or a rear camera. The front camera and the rear camera may receive external multimedia data while the terminal device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone (MIC) configured to receive an external audio signal when the terminal device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the terminal device 800. For instance, the sensor component 814 may detect an open/closed status of the terminal device 800 and relative positioning of components (e.g., the display and the keypad of the terminal device 800). The sensor component 814 may also detect a change in position of the terminal device 800 or of a component in the device 800, a presence or absence of user contact with the terminal device 800, an orientation or an acceleration/deceleration of the terminal device 800, and a change in temperature of the terminal device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate wired or wireless communication between the terminal device 800 and other devices. The terminal device 800 can access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as the memory 804 including instructions. The above instructions are executable by the processor 820 in the terminal device 800, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium having stored therein instructions that, when executed by a processor of a terminal device, causes the mobile terminal device to perform a method for complying a router management application with a router firmware. The method includes: obtaining a current version of the router management application and a current version of the router firmware, in which a router is managed by the router management application; determining an object to be upgraded and an object not to be upgraded from the router management application and the router firmware according to the current version of the router management application and the current version of the router firmware, if the router management application is not compatible with the router firmware; obtaining a target version of the object to be upgraded, wherein the target version is compatible with the object not to be upgraded; and upgrading the object to be upgraded according to the target version.

Alternatively, obtaining a current version of a router firmware includes: obtaining a user identification of the router, obtaining a firmware version of the router bound to the user identification from a server, and determining the firmware version as the current version of the router firmware; or obtaining an identification of the router from the router management application, and obtaining the current version of the router firmware from the router according to the identification of the router.

Alternatively, determining an object to be upgraded and an object not to be upgraded from the router management application and the router firmware according to the current version of the router management application and the current version of the router firmware includes: obtaining a firmware version of the router compatible with the router management application corresponding to a correlation between versions of the router management application and versions of the router firmware according to the current version of the router management application; determining the router firmware as the object to be upgraded and determining the router management application as the object not to be upgraded, if the router firmware version is higher than the current version of the router firmware; determining the router management application as the object to be upgraded and determining the router firmware as the object not to be upgraded, if the router firmware version is lower than the current version of the router firmware.

Alternatively, determining an object to be upgraded and an object not to be upgraded from the router management application and the router firmware according to the current version of the router management application and the current version of the router firmware includes: determining a version range of the router management application comprising the current version of the router management application; obtaining a version range of the router firmware compatible with the router management application from a correlation between version ranges of the router management application and version ranges of the router firmware according to the version range of the router management application; determining the router firmware as the object to be upgraded and determining the router management application as the object not to be upgraded, if a lower limit of the version range of the router firmware is higher than the current version of the router firmware; determining the router management application as the object to be upgraded and determining the router firmware as the object not to be upgraded, if an upper limit of the version range of the router firmware is lower than the current version of the router firmware.

Alternatively, obtaining a target version of the object to be upgraded includes: obtaining versions of the object to be upgraded, in which the versions are compatible with the object not to be upgraded; and selecting one version from the versions of the object to be upgraded, and using the selected version as the target version.

In embodiments of the present disclosure, the current version of the router management application and the current version of the router firmware are obtained, and if the router management application is not compatible with the router firmware, the object to be upgraded and the object not to be upgraded are determined according to the current version of the router management application and the current version of the router firmware, the target version of the object to be upgraded compatible with the object not to be upgraded is obtained, and the object to be upgraded is upgraded according to the target version, such that the router management application is compatible with the router firmware. In this way, the user may manage the router using the router management application.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method executed by software instructions on a hardware processor for complying a router management application with a router firmware, comprising:
    obtaining a current version of the router management application and a current version of the router firmware, wherein a router is managed by the router management application, and wherein obtaining the current version of the router firmware comprises;
        obtaining a user identification of the router,
        obtaining a firmware version of the router bound to the user identification from a server, and
        determining the firmware version as the current version of the router firmware;
    determining a version range of the router management application comprising the current version of the router management application and another distinct version, if the router management application is not compatible with the router firmware;
    obtaining a version range of the router firmware comprising at least two distinct versions compatible with the router management application corresponding to a correlation between version ranges of the router management application and version ranges of the router firmware according to the version range of the router management application;
    determining the router firmware as the object to be upgraded and determining the router management application as the object not to be upgraded, if a lower limit of the version range of the router firmware is higher than the current version of the router firmware;
    determining the router management application as the object to be upgraded and determining the router firmware as the object not to be upgraded, if an upper limit of the version range of the router firmware is lower than the current version of the router firmware;
    obtaining a target version of the object to be upgraded, wherein the target version is compatible with the object not to be upgraded; and
    upgrading the object to be upgraded according to the target version.

2. The method according to claim 1, wherein obtaining the current version of the router firmware comprises:
    obtaining an identification of the router from the router management application; and
    obtaining the current version of the router firmware from the router according to the identification of the router.

3. The method according to claim 1, wherein determining the object to be upgraded and the object not to be upgraded from the router management application and the router firmware according to the current version of the router management application and the current version of the router firmware comprises:
- obtaining a router firmware version compatible with the router management application corresponding to a correlation between versions of the router management application and versions of the router firmware according to the current version of the router management application;
- determining the router firmware as the object to be upgraded and determining the router management application as the object not to be upgraded, if the router firmware version is higher than the current version of the router firmware; and
- determining the router management application as the object to be upgraded and determining the router firmware as the object not to be upgraded, if the router firmware version is lower than the current version of the router firmware.

4. The method according to claim 1, wherein obtaining the target version of the object to be upgraded comprises:
- obtaining versions of the object to be upgraded compatible with the object not to be upgraded;
- selecting one version from the versions of the object to be upgraded; and
- using the selected version as the target version.

5. A terminal device for complying a router management application with a router firmware, comprising:
- a processor;
- a memory configured to store instructions executable by the processor;
- wherein the processor is configured to:
  - obtain a current version of the router management application and a current version of the router firmware, wherein a router is managed by the router management application, and wherein obtaining the current version of the router firmware comprises:
    - obtaining a user identification of the router,
    - obtaining a firmware version of the router bound to the user identification from a server, and
      - determining the firmware version as the current version of the router firmware;
  - determine a version range of the router management application comprising the current version of the router management application and another distinct version, if the router management application is not compatible with the router firmware;
  - obtain a version range of the router firmware comprising at least two distinct versions compatible with the router management application corresponding to a correlation between version ranges of the router management application and version ranges of the router firmware according to the version range of the router management application;
  - determine the router firmware as the object to be upgraded and determining the router management application as the object not to be upgraded, if a lower limit of the version range of the router firmware is higher than the current version of the router firmware;
  - determine the router management application as the object to be upgraded and determining the router firmware as the object not to be upgraded, if an upper limit of the version range of the router firmware is lower than the current version of the router firmware;
  - obtain a target version of the object to be upgraded, wherein the target version is compatible with the object not to be upgraded; and
  - upgrade the object to be upgraded according to the target version.

6. The terminal device according to claim 5, wherein obtaining the current version of the router firmware comprises:
- obtaining an identification of the router from the router management application; and
- obtaining the current version of the router firmware from the router according to the identification of the router.

7. The terminal device according to claim 5, wherein determining the object to be upgraded and the object not to be upgraded from the router management application and the router firmware according to the current version of the router management application and the current version of the router firmware comprises:
- obtaining a router firmware version compatible with the router management application corresponding to a correlation between versions of the router management application and versions of the router firmware according to the current version of the router management application;
- determining the router firmware as the object to be upgraded and determining the router management application as the object not to be upgraded, if the router firmware version is higher than the current version of the router firmware; and
- determining the router management application as the object to be upgraded and determining the router firmware as the object not to be upgraded, if the router firmware version is lower than the current version of the router firmware.

8. The terminal device according to claim 5, wherein obtaining the target version of the object to be upgraded comprises:
- obtaining versions of the object to be upgraded compatible with the object not to be upgraded;
- selecting one version from the versions of the object to be upgraded; and
- using the selected version as the target version.

9. A non-transitory computer-readable storage medium having stored therein instructions that, when executed by a processor of a terminal device, causes the terminal device to perform a method for complying a router management application with a router firmware, the method comprising:
- obtaining a current version of the router management application and a current version of the router firmware, wherein a router is managed by the router management application, and wherein obtaining the current version of the router firmware comprises:
  - obtaining a user identification of the router,
  - obtaining a firmware version of the router bound to the user identification from a server, and
  - determining the firmware version as the current version of the router firmware;
- determining a version range of the router management application comprising the current version of the router management application and another distinct version, if the router management application is not compatible with the router firmware;
- obtaining a version range of the router firmware comprising at least two distinct versions compatible with the router management application corresponding to a correlation between version ranges of the router management application and version ranges of the router firmware according to the version range of the router management application;

determining the router firmware as the object to be upgraded and determining the router management application as the object not to be upgraded, if a lower limit of the version range of the router firmware is higher than the current version of the router firmware;

determining the router management application as the object to be upgraded and determining the router firmware as the object not to be upgraded, if an upper limit of the version range of the router firmware is lower than the current version of the router firmware;

obtaining a target version of the object to be upgraded, wherein the target version is compatible with the object not to be upgraded; and upgrading the object to be upgraded according to the target version.

* * * * *